April 21, 1959   E. ROSE   2,883,130
VIBRATION ABSORBER
Filed March 14, 1955
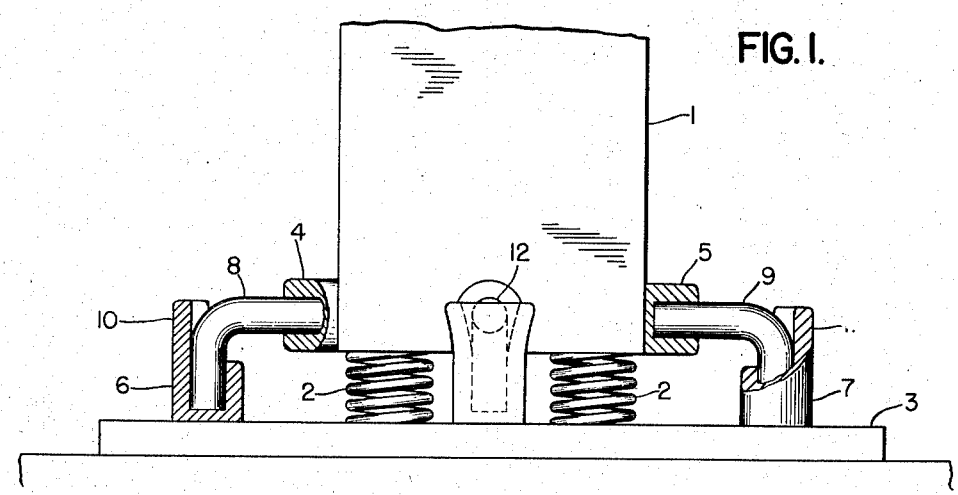
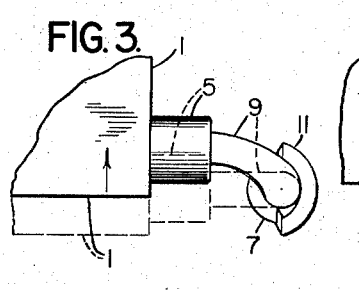
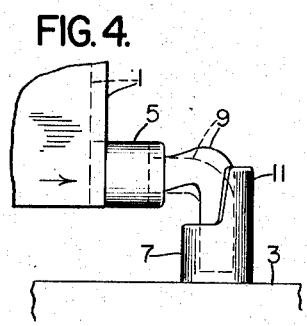
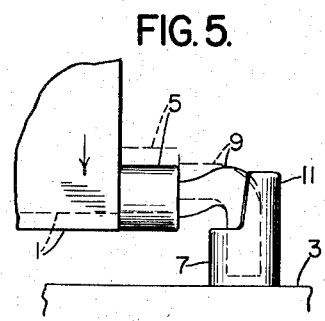
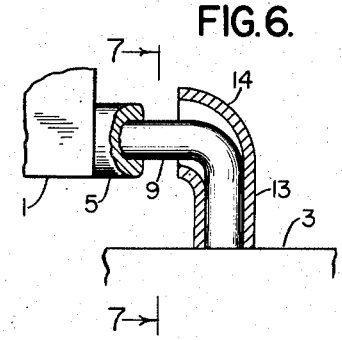
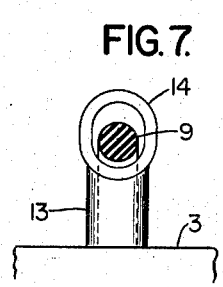
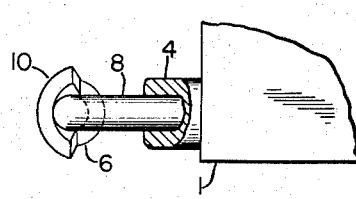
INVENTOR.
EDGAR ROSE
BY *Andrus & Sceales*
Attorneys

United States Patent Office 2,883,130
Patented Apr. 21, 1959

2,883,130

VIBRATION ABSORBER

Edgar Rose, Oshkosh, Wis., assignor to Kiekhaefer Corporation, Cedarburg, Wis., a corporation of Wisconsin Application March 14, 1955, Serial No. 494,216

4 Claims. (Cl. 248—22)

This invention relates to cushioning devices for supporting and absorbing the vibrations of machines.

According to the invention, each absorber comprises an L-shaped resilient cushioning element having opposite ends respectively secured to the machine and to a base and engaging selected abutments fixed in relation either to the machine or to the base to provide the desired resistance of the element to a given vibratory movement of the machine. The elements are intended to be generally employed in opposite pairs with each element in approximately the same plane. The L-shaped configuration of the elements allows the design of the abutments to provide the "best results." The abutments may be varied solely with respect to the vibratory movement of the machine in any one direction so that the component forces of unbalance in the machine may be separately dealt with in arranging the abutments.

The drawings furnished herewith illustrate the best mode of carrying out the invention as presently contemplated and set forth hereinafter.

In the drawings:

Figure 1 is an end view of a machine shown diagrammatically and having a relatively stationary base. The corresponding ends of the resilient stabilizing elements are secured in sockets fixed to the machine and in sockets fixed to the base and providing the abutments for the cushioning elements;

Fig. 2 is a plan view of the base socket and element on the left side of the machine shown in Figure 1 and with a part of the machine socket broken away and sectioned;

Figs. 3, 4 and 5 show the deformation of the element upon movement of the machine in the direction indicated by the arrows;

Fig. 6 shows a base socket having a flared opening and forming an abutment to restrain the element in all directions except away from the opening; and Fig. 7 is a sectional view taken on line 7—7 of Fig. 6.

The vibrating machine 1 is shown diagrammatically in the drawings and may be resiliently supported at least partially by the springs 2 on the base 3 for relatively free vibration as shown in Figure 1 or may be supported solely by the cushioning elements of the invention as shown in Figs. 2–7.

The sockets 4 and 5 are secured to the left and right sides of machine 1 as shown in Figure 1 and open in opposite directions. The sockets 6 and 7 open upwardly and are secured to base 3 adjacent to the corresponding sockets 4 and 5. The elements 8 and 9 are identical and comprise round solid pieces of compressible material, such as rubber, and are either bent to an L-shape or molded in that shape. The opposite ends of element 8 are disposed in sockets 4 and 6 at the left side of machine 1 and corresponding ends of element 9 are disposed in sockets 5 and 7 at the right side of machine 1.

The vibration of the machine in any given direction deforms the elements and is resisted to a degree depending on the characteristics of the elements and their free movement as determined by abutments fixed either to the base or the machine or both.

The abutments 10 and 11 illustrate one form thereof and are formed integrally with the sockets 6 and 7 as a matter of convenience whereby other sockets, not shown, with abutments of other forms may be readily substituted to provide the desired support of the elements. Abutments 10 and 11 as shown are substantially identical and extend upwardly from the respective sockets. The face of each abutment is of circular horizontal section which increases in diameter toward the upper end.

The movement of machine 1 in a direction as shown in Fig. 3, and which is generally normal to a plane defined by the L-shaped element 9, imposes a force on element 9 in shear which is resisted by the element and with a given deflection the abutment 11 by reason of its contour and location increases the resistance at a predetermined rate. Other elements such as element 12 shown in Figure 1 and set at right angles to the plane of elements 7 and 9 may also be employed as required.

Movement of machine 1 in the direction of the abutment 11 as shown in Fig. 4, forces element 9 directly against the abutment so that the horizontal length of the element is directly compressed. The compression referred to may resist the deflection at a rate except to the extent that the material of the element is distended upwardly as shown in Fig. 4.

Another form of abutment is shown in Figs. 6 and 7 to be engaged by element 9 upon motion of the machine in the directions of Figs. 3, 4 and 5. The base socket 13 is provided with the flared upper end 14 to support element 9 against deflection in the directions referred to and illustrates the variety of abutments which may be employed to approach or achieve optimum vibration absorption or cushioning.

The abutments may be formed and secured separately of the sockets where desired, and the ends of the elements may be bonded or otherwise secured to machine 1 and base 3 with other than sockets of the type shown and described.

Various modes of carrying out the invention are contemplated as within the scope of the following claims particularly pointing out and distinctly claiming the subject matter which is regarded as the invention.

I claim:

1. A vibration cushioning device for connecting a vibrating part to a relatively stationary part, a resilient L-shaped element having two ends extending in different directions from one another, one end being rigidly secured to one said part, a socket member on said other part for holding the other said end, and an abutment formed integrally with said socket member and being of increasing diameter as it extends from said member, said abutment being progressively engageable by said element as the later distorts to thereby restrain movement of said vibrating part.

2. A vibration cushioning device for connecting a vibrating part to a relatively stationary part, a resilient L-shaped element of round cross section having two ends extending at right angles to one antoher, one end being rigidly secured to one said part, a tubular socket member on said other part for holding the other said end, and an abutment formed integrally with said member and being of increasing diameter as it extends from said member, said abutment being progressively engageable by said element as the latter distorts to thereby restrain movement of said vibrating part.

3. A vibration cushioning device for connecting a vibrating part to a relatively stationary part, a resilient L-shaped element having two ends extending in different directions from one another, one end being rigidly secured to one said part, a socket member on said other part for holding the other said end, and an abutment having a face of generally semicircular cross section formed integrally with said member and being of increasing diameter as it extends away from said member, said abutment face being progressively engageable by said element as the latter distorts to thereby restrain movement of said vibrating part.

4. A vibration cushioning device for connecting a vibrating part to a relatively stationary part, a resilient L-shaped element having two ends extending in different directions from one another, one end being rigidly secured to one said part, a socket member on said other part for holding the other said end, and a flared abutment formed integrally with said member and extending generally at right angles thereto, said abutment being of increasing diameter as it extends from said member, said abutment being progressively engageable by said elements as the latter distorts to thereby restrain movement of said vibrating part in any direction.

References Cited in the file of this patent

UNITED STATES PATENTS

| | | |
|---|---|---|
| 2,187,924 | Winkleman | Jan. 23, 1940 |
| 2,271,560 | Korte et al. | Feb. 3, 1942 |
| 2,294,674 | Lord | Sept. 1, 1942 |
| 2,751,147 | Wurtz | June 19, 1956 |

FOREIGN PATENTS

| | | |
|---|---|---|
| 481,051 | Canada | Feb. 12, 1952 |